Aug. 30, 1966   C. G. BUCKLEY   3,269,194
ANTI-FRICTION MECHANISM FOR GYROSCOPIC DEVICES
Filed April 29, 1963   3 Sheets-Sheet 2

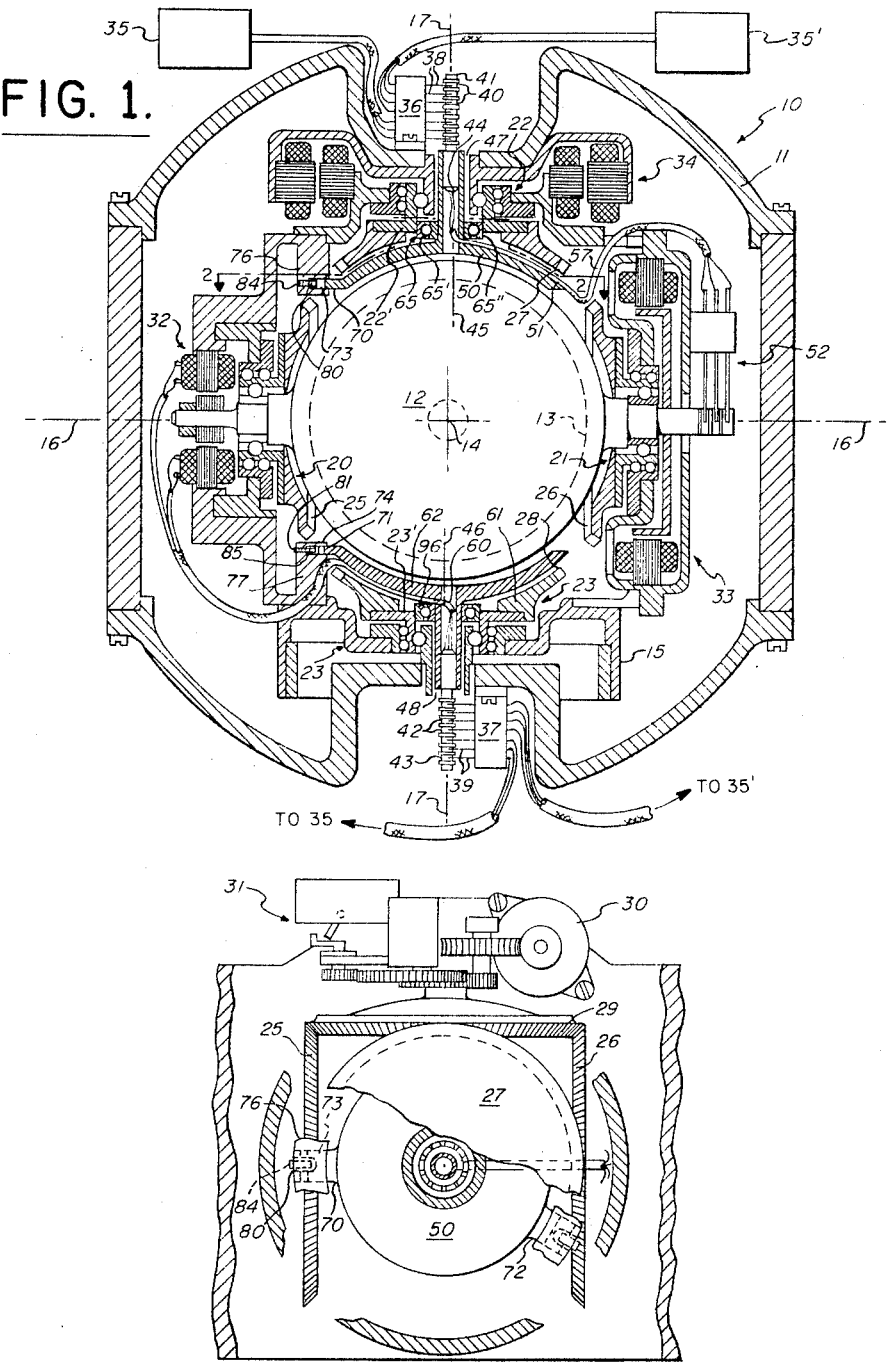

INVENTOR.
CHARLES G. BUCKLEY
BY
ATTORNEY

Aug. 30, 1966  C. G. BUCKLEY  3,269,194
ANTI-FRICTION MECHANISM FOR GYROSCOPIC DEVICES
Filed April 29, 1963  3 Sheets-Sheet 3

INVENTOR.
CHARLES G. BUCKLEY
BY
*[signature]*
ATTORNEY

United States Patent Office 3,269,194
Patented August 30, 1966

3,269,194
ANTI-FRICTION MECHANISM FOR
GYROSCOPIC DEVICES
Charles G. Buckley, Huntington, N.Y., assignor to Sperry
Rand Corporation, Great Neck, N.Y., a corporation of
Delaware
Filed Apr. 29, 1963, Ser. No. 276,529
15 Claims. (Cl. 74—5)

The present invention relates to an anti-friction mechanism for the moving elements of gyroscopic devices and the like, and particularly relates to anti-friction mechanisms for improving the accuracy of gyroscopic instruments by minimizing frictional effects due to electrical coupling between relatively rotating members.

The present invention is applicable to gyroscopes and is particularly useful with respect to gyroscopes utilized in stable reference platforms, for example, of the type shown in U.S. Patent 2,977,806 of A. W. Lane, issued April 4, 1961. In the gyroscopic platform disclosed in said U.S. Patent 2,977,806, two identical two degree of freedom directional gyros are disclosed with their spin axes oriented orthogonally with respect to each other to provide indications of heading and verticality. Each of the directional gyros disclosed in said U.S. Patent 2,977,806 preferably incorporates the invention disclosed in U.S. Patent 2,970,480 entitled, "Anti-Friction Support Mechanism for Gyroscopic Devices," issued February 7, 1961, to E. L. Ziegler et al., which latter invention utilizes pairs of compound bearings in which the middle races of each of the bearings is rotated in a direction opposite to that of the other one of said pair and periodically the direction of rotation of each of said middle races is simultaneously reversed.

Referring to the gyro platform disclosed in said U.S. Patent 2,977,806, each of the directional gyroscopes has its outer gimbal axis aligned to the local vertical during operation. In order to conduct electrical power and operating signals between the gyro elements and the platform gimbals, each gyro has a large number of slip rings on its vertical axis. For example, one gyroscope being produced presently has two pairs of 22 slip rings resulting in a total of 44 brush-to-slip ring contacts with respect to the gyro vertical axis. During operation, the directional gyros remain substantially fixed in space while the platform moves around the gyros due to movement of the vehicle on which the platform is mounted. When the platform is turned in azimuth due to an azimuthal turn of the vehicle, the slip rings which are fixed to the gyro elements remain fixed in space while the brushes which are carried by the platform gimbal slide over the slip rings.

As the result of the platform construction described above, undesirable torques are produced on the gyro element during turns of the platform in azimuth because of the drag of the brushes on the slip rings. Due to the nature of these slip ring drag torques, undesirable torques are applied to the sensitive vertical axis of the gyro which introduces undesirable drift of the gyroscope thereby resulting in erroneous output signals therefrom, the effects of which may be quite severe in high speed turns of long duration. The slip ring drag torques consist primarily of Coulomb friction, i.e., resistance to motion other than that resistance resulting from viscous friction effects owing to windage, lubricant drag, and the like.

It is therefore a primary object of the present invention to provide an improved anti-friction mechanism for gyroscopic instruments.

It is a further object of the present invention to provide an anti-friction mechanism for gyroscopic instruments which appreciably improves the accuracy of said instruments.

It is an additional object of the present invention to provide apparatus in gyroscopic instruments which appreciably reduces the drift of said instruments caused by brush-slip ring induced torques.

The above objects are achieved by means of the present invention by providing apparatus to move the slip ring in such a manner that the ring-to-brush sliding velocity is a periodic function of time with peak velocity large compared with the velocity resulting from the vehicle turning rate. The desired slip ring motion can be obtained by orbiting the slip rings in a path around the gyro gimbal axes by means of eccentric motion inducing apparatus which results in a sinusoidal brush sliding velocity.

Referring now to the drawings,

FIG. 1 is an elevational view partly in section of a directional gyroscope incorporating the present invention;

FIG. 2 is a top view of FIG. 1 with parts of the drawing in section;

Figure 3:
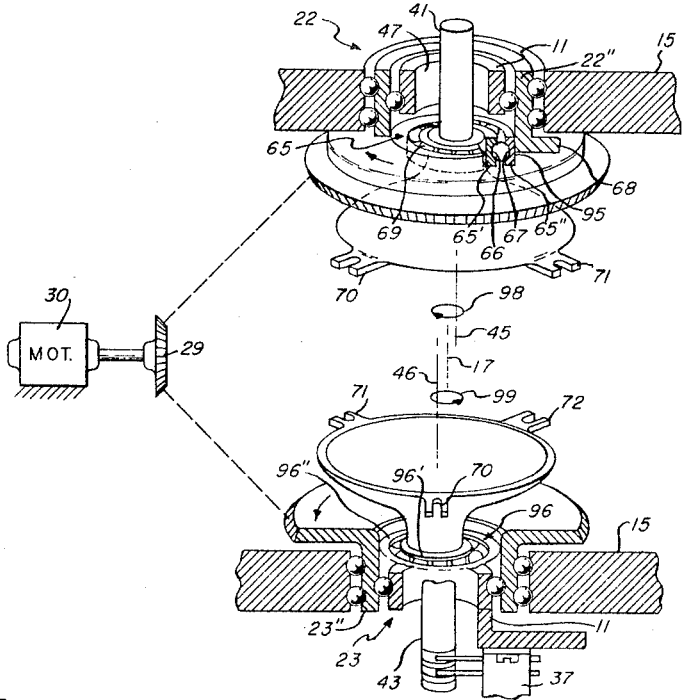
FIG. 3 is a schematic view showing the spaced eccentric bearings and the relative motion of the respective slip rings.

While the present invention will be described with respect to the vertical axis of a two degree of freedom directional gyro, it will be appreciated that the invention is equally applicable to other types of gyros and to other axes and further including gyroscopic stable platforms.

Referring now to FIGS. 1 and 2 of the drawings, a directional gyroscope 10 is shown having an outer housing or frame 11 that may be suitably fixed to an aircraft or may be mounted within a gyro platform, for example, of the type shown in said U.S. Patent 2,977,806. The directional gyro 10 includes an inner gimbal or rotor case 12 within which a rotor 13, shown in dotted lines, spins about a horizontal spin axis 14 by electric motor means not shown. The rotor case 12 is universally supported on the housing 11 by an outer gimbal 15. The rotor case 12 is journalled to rotate within the outer gimbal 15 about a horizontal axis 16 by means of spaced compound bearings 20 and 21. The outer gimbal 15 in turn is journalled within the outer housing 11 to rotate about a vertical axis 17 by means of spaced compound bearings 22 and 23. The axes 14, 16, and 17 are mutually perpendicular with respect to each other. Each of the compound bearings 20, 21, 22, and 23 include an inner ring having an inner race, a middle ring having inner and outer races, and an outer ring having an outer race with bearing balls disposed between the respective races in a manner disclosed in said U.S. Patent 2,970,480. The balls are retained in ball retainers not shown. The inner, middle and outer rings of the respective bearings 20, 21, 22, and 23 will be designated by the reference numeral associated with the bearing and further including prime ('), double prime ("), and triple prime ('''), respectively. The middle rings 20", 21", 22", and 23" are connected to respective bevel gears 25, 26, 27, and 28. As shown more clearly in FIG. 2, the bevel gears 25, 26, 27, and 28 (28 not being visible) mesh with a common bevel gear 29 which in turn is driven by a reversible motor 30 in a manner disclosed in detail in said U.S. Patent 2,970,480. The direction of rotation of the motor is reversed periodically by means of switch means 31 connected to the motor 30 in order that the direction of rotation of the middle rings 20", 21", 22", and 23" is periodically and simultaneously reversed in a manner and for reasons fully explained in said U.S. Patent 2,970,480.

The gyroscope 10 further includes conventional pick-off and torquing devices, for example, with respect to the axis 16 it includes a pick-off 32 and a torquer 33 while with respect to the axis 17 it includes a pick-off 34. The pick-off and torquing devices as well as the rotor driving motor require electrical power from a suitable external power source 35 and/or provide electrical signal outputs to signal utilization devices such as 35′. The power source 35 and device 35′ are connected to brush blocks 36 and 37 which are mounted on opposed portions of the outer housing 11. A plurality of brushes 38 and 39 extend from the brush blocks 36 and 37, respectively. The brushes 38 are cooperative with a corresponding number of slip rings 40 which are mounted on a slip ring shaft 41. The centers of the slip rings 40 define an axis of symmetry 45. In a similar manner, the brushes 39 of the brush blocks 37 are cooperative with a corresponding number of slip rings 42 that are mounted on a slip ring shaft 43. The centers of the slip rings 42 define an axis of symmetry 46. The slip ring shafts 41 and 43 extend exteriorly from opposite ends of the gyroscope 10 through apertures 47 and 48 respectively in the outer housing 11.

Preferably, the shaft 41 is hollow in order that electrical leads 44 may be connected to respective slip rings 40 and bundled within the hollow shaft 41. The slip ring shaft 41 is connected to the center of a slip ring bridge support member 50. The bridge member 50 is dome shaped and disposed between the rotor housing 12 and the bevel gear 27. The electrical leads 44 within the hollow shaft 41 protrude through an opening in the side of the shaft 41 and along a depression 51 in the upper surface of the bridge support member 50 to the torquing device 33 and to the rotor drive motor (not shown) by means of another brush and slip ring arrangement 52 with respect to the horizontal axis 16. The leads 44 have a flex loop 57 therein to provide relative movement of the bridge support member 50 with respect to the outer gimbal 15 without damaging the leads 44.

The bridge support member 50 is slidably positioned on the outer gimbal 15 by means of three equally spaced keyed projections 70, 71 and 72 only 70 and 71 being visible in FIGS. 1 and 2. The projections 70, 71 and 72 are adapted to slide in a horizontal plane as shown in FIG. 1 in respective guides 73, 74 and 75 disposed in brackets 76, 77 and 78 respectively mounted on the outer gimbal 15. The extremities of projections 70, 71 and 72 have keyways 80, 81 and 83 respectively which cooperate with respective pins 84, 85 and 86 mounted in the brackets 76, 77 and 78 which permit limited relative movement of the bridge support member 50 with respect to the outer gimbal 15 as required by the motion induced by an eccentric bearing 65 in a manner to be explained. The elements 72, 75, 78, 83 and 86 are not visible in FIG. 1. The eccentric bearing 65 is arranged to maintain the axis of symmetry 45 parallel to the axis 17 and to cause the axis of symmetry 45 to rotate around the axis 17 in a manner to be explained to reduce gyroscopic drift.

The brushes 38 acting on the slip rings 40 and 42 in the absence of the present invention introduce an undesirable torque about the axis 17 which results in an undesirable coercion or drift of the spin axis 14 of the rotor 13, thereby providing erroneous signals from the directional gyroscope 10.

The present invention virtually eliminates the effects of the undesirable torque with respect to the axis 17 by substantially cancelling the Coulomb friction which is the principal cause of the undesirable drift. This is accomplished by means of the present invention by causing the slip ring shafts 41 and 43 to rotate or orbit around the axis 17 in a very small circle. To accomplish this, the eccentric ball bearing 65 has its inner ring 65′ mounted on the shaft 41 and its outer ring 65″ connected to a flanged extension 68 of the middle ring 22″ of the compound bearing 22. A plurality of bearing balls 69 are disposed in a ball retainer between the inner and outer races 66 and 67, respectively, of the respective inner and outer rings 65′ and 65″ of the eccentric bearing 65. The bearing 65 is eccentric as shown more clearly in the enlarged and exaggerated view of FIG. 3, in that, the outer race 67 is displaced eccentrically .002 inch with respect to the outside diameter as represented by the outer surface 95 of the outer ring 65″.

In a similar manner, the shaft 43 is hollow in order that electrical leads 60 connect to respective slip rings 42 and extend along a depression 61 in a bridge support member 62 to connect with the pick-off 32. The shaft 43 and bridge support member 62 are identically arranged and rotated as described above with respect to the shaft 41 and the bridge support member 50 except that preferably the eccentric bearing 96 has its point of major eccentricity disposed 180° away from or out of phase with that of the eccentric bearing 65. Further, the outer ring 96″ of the eccentric bearing 96 is preferably rotated in a direction opposite to that of the outer ring 65″. The outer rings 65″ and 96″ should also be periodically and simultaneously reversed in direction. By connecting the outer rings 65″ and 96″ to the middle rings 22″ and 23″ respectively which have the desired motion as explained in said U.S. Patent 2,970,480, the outer rings 65″ and 96″ will inherently have the same desired motion. The motor 30 drives the common bevel gear 29 through a gear train in order that the middle rings 22″ and 23″ are rotated simultaneously but in directions opposite with respect to each other. The outer ring 65″ is connected to and is disposed within the middle ring 22″ and therefore they rotate together as a single unit. Similarly, the outer ring 96″ is connected to and is disposed within the middle ring 23″ and therefore they rotate together as a single unit. Thus, the outer rings 65″ and 96″ also rotate in directions opposite with respect to each other. When the direction of rotation of the motor is reversed by switch means 31, the direction of rotation of the middle ring 22″ and the outer ring 65″ is reversed with respect to the direction of rotation of the middle ring 23″ and the outer ring 96″.

Referring now to FIG. 3 which has been enlarged and exaggerated to emphasize the operation of the present invention, the brush blocks 36 (not shown) and 37 are normally mounted upon element 11 (shown as an inner ring) but brush block 36 has been omitted for purposes of simplicity. Because of the eccentric bearings 65 and 96, the shafts 41 and 43 are mounted with their respective axes of symmetry 45 and 46 parallel to the vertical axis 17. The axis of symmetry 45 being shown for example to the right of the axis 17 while the axis of symmetry 46 is shown to the left of the axis 17. As the middle rings 22″ and 23″ are rotated in opposite directions by the motor 30 driving through the gear train, the eccentric outer rings 65″ and 96″ are also rotated in opposite directions with respect to each other. As the eccentric outer ring 65″ rotates in a clockwise direction, for example, the center of the inner ring 65′ and thus the axis of symmetry 45 of the shaft 41 is likewise rotated in a small circle 98 around the axis 17 defined by the eccentricity of the outer ring 65″. At the same time, the counterclockwise rotation of the eccentric outer ring 96″ causes the axis of symmetry 46 of the shaft 43 to be rotated in a counterclockwise direction in a small circle 99 defined by the eccentricity of the outer ring 96″, thereby providing the rotating motion necessary to minimize the Coulomb friction. Preferably, the axes of symmetry 45 and 46 are initially arranged 180° out of phase to provide maximum averaging.

By means of the present invention as described above, coercive torques which result from Coulomb sliding friction between electrical slip rings and brushes located on a gyroscopic axis of freedom are virtually eliminated. The reduction in coercive torques is realized by virtue of the motion imparted to the slip rings by the device described herein due to the nature of the Coulomb frictional torque.

Under practical conditions the predominant torque generated by the sliding of a slip ring against its mating brush is Coulomb frictional torque, that is, independent of the magnitude of sliding velocity and of symmetrical characteristics for positive and negative sliding velocity. This invention exploits this characteristic of Coulomb friction to reduce average coercive torques to very low values by imposing a sinusoidal sliding velocity between the slip rings and brushes which has large amplitude and frequency relative to the sliding velocity induced by a relative rotation between the gryoscopic gimbals which it is desired to isolate. It can be shown that the coercive Coulomb frictional torque which is anticipated as a result of relative rotation of gyroscopic gimbal members is reduced by a factor equal to the ratio of the difference between positive direction sliding time and negative direction sliding time to the period of the slip ring rotational or orbital motion when utilizing the present invention as described. Analysis of a particular two degree of freedom directional gyroscope results in the performance curves of FIG. 4.

Figure 4:
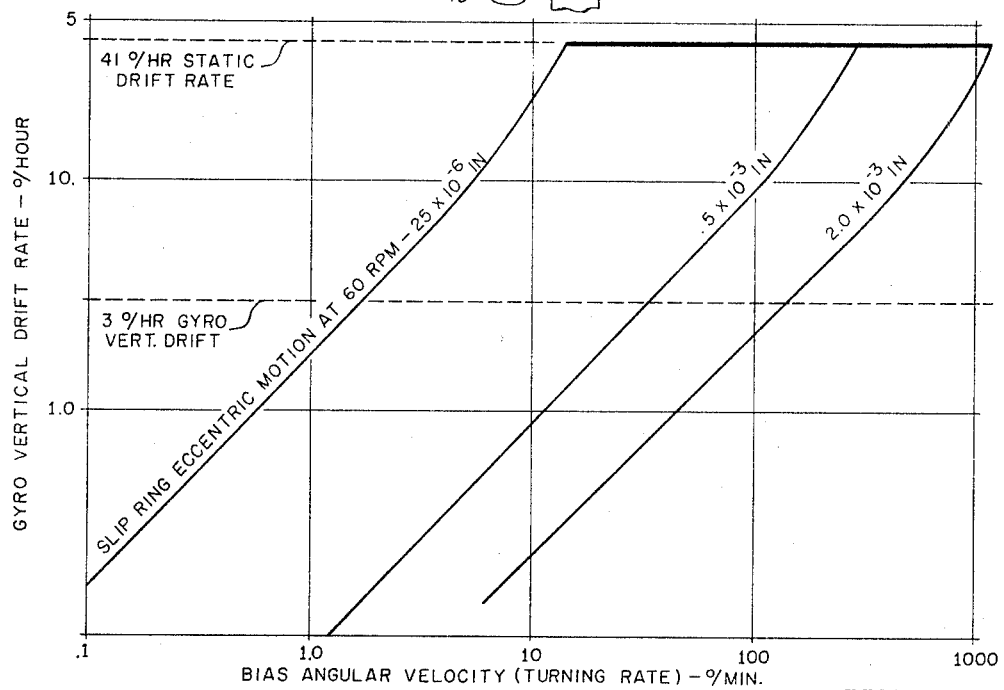
FIG. 4 is a graph of gyro vertical drift rate $\dot{\theta}$ vs. azimuth turning rate for various magnitudes of slip ring eccentric motion.

The graph of FIG. 4 is based upon the following theoretical analysis of a gyroscope incorporating the present invention.

The sliding velocity of a brush over a slip ring is represented by $$V_{(t)} = e.\omega_R . \cos \omega_R t + r.\omega_b \qquad (1)$$

where $V_{(t)}$ = sliding velocity, cm./sec.
$e$ = eccentricity of slip ring motion, cm.
$\omega_R$ = ring eccentric centre line velocity, rad./sec.
$\omega_b$ = bias velocity (turning rate), rad./sec.
$r$ = slip ring radius, cm.

Since Coulomb friction is the major contribution to gyro torques produced by the rings and brushes only its effects will be considered.

If the ring/brush sliding velocity is sinusoidal with zero bias, the times of sliding in the (+) direction equals the times of sliding in the (−) direction and the average effect of friction torque sensed by the gyro elements is zero. When a bias velocity is imposed the time of sliding (+) plus and (−) minus differ and a net drag torque results.

Equations will be developed on the basis of the asymmetrical sliding times in order to determine gyro torque vs. bias velocity.

From Equation 1 above sliding velocity changes direction when:

$$V_{(t)} = 0$$

$$e.\omega_R . \cos \omega_R t = -r.\omega_b \qquad (2)$$

$$\cos \omega_R . t = -\frac{r.\omega_b}{e.\omega_R} \qquad (3)$$

let $$C = -\frac{r.\omega_b}{e.\omega_R} \qquad (4)$$

where $C \leq 1$ for valid range

There are always two solutions of $t$ from Equation 2 when:

$$C \leq 1$$

$$\cos \omega_R t_1 = C \qquad (5)$$

$$\cos \omega_R t_2 = C \qquad (6)$$

Figure 5:
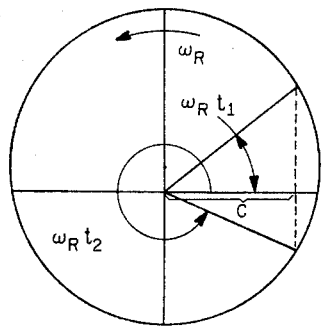
FIG. 5 is a vector diagram which provides a graphical representation of Equations 5 and 6.

From FIG. 5 it is seen that:

$$\omega_R t_2 = 2\pi - \omega_R t_1 \qquad (7)$$

or $$t_2 = \frac{2\pi}{\omega_R} - t_1 \qquad (8)$$

Figure 6:
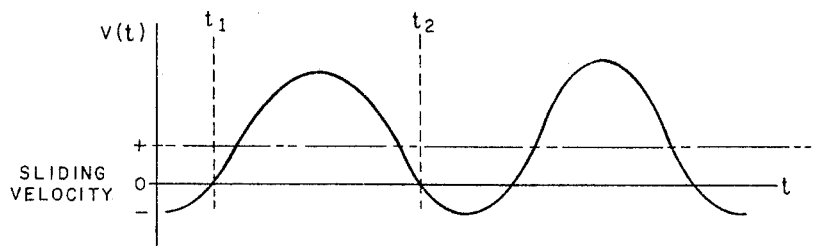
FIG. 6 is a graph of sliding velocity versus time.
Figure 7:
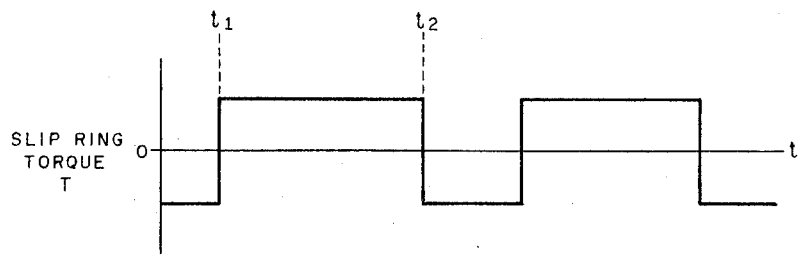
FIG. 7 is a graph of slip ring torque versus time to the same scale as FIG. 6.

The difference between the time when sliding velocity is (+) and (−) is expressed by the following relationship (see FIGS. 6 and 7).

$$\Delta t = (t_2 - t_1) - 2t_1 = t_2 - 3t_1 \qquad (9)$$

or substituting Equation 8

$$\Delta t = \left\{ \frac{2\pi}{\omega_R} - t_1 \right\} - 3t_1 = \frac{2\pi}{\omega_R} - 4t_1 \qquad (10)$$

Substitute Equation 5, $$\Delta t = \frac{2\pi}{\omega_R} - \frac{4}{\omega_R} \cos^{-1} C = \frac{2}{\omega_R}(\pi - 2 \cos^{-1} C) \qquad (11)$$

NOTE.—$\Delta t$ is the time that the sliding velocity is more (+) or more (−) during one oscillation cycle.

Gyro drift rate is expressed by the following relationship:

$$\dot{\theta} = \frac{d\theta}{dt} = \frac{T}{H} \qquad (12)$$

$T$ = torque
$H$ = angular momentum

Where $d\theta$ is the incremental shift in gyro position during one oscillation cycle, and $dt$ is one cycle time, $$d\theta = \frac{T}{H} \cdot \Delta t \qquad (13)$$

where $T$ = slip ring drag torque, and $$T = \mu P r n \qquad (14)$$

$\mu$ = coeff. of friction (slip ring/brush)
$P$ = brush pressure
$r$ = radius of slip ring
$n$ = number of brushes Substitute Equation 11 into 14, $$d\theta = \frac{\mu P r n}{H} \cdot \frac{2}{\omega_R}(\pi - 2 \cos^{-1} C) \qquad (15)$$

Since:

$$dt = \frac{2\pi}{\omega_R} \frac{\text{rad./cycle}}{\text{rad./sec.}} = \frac{\text{sec.}}{\text{cycle}} \text{ (Oscillation period)} \qquad (16)$$

Average gyro drift rate during one oscillation period will be, $$\dot{\theta} = \frac{d\theta}{dt} = \frac{\mu P r n}{\pi H}(\pi - 2 \cos^{-1} C) \qquad (17)$$

Since $$C = \frac{r.w_b}{e.w_r} \qquad (4)$$

the sign can be dropped since $\cos(-\theta) = \cos(+\theta)$ $$\dot{\theta} = \frac{\mu.P.r.n}{\pi H}\left[\pi - 2 \cos^{-1}\left\{\frac{r.\omega_b}{e.\omega_r}\right\}\right] \qquad (18)$$

or $$\dot{\theta} = \frac{\mu.P.r.n.K}{\pi}\left[\pi - 2 \cos^{-1}\left\{\frac{r.\omega_b}{e.\omega_r}\right\}\right] \qquad (19)$$

where $K$ = gyro precession constant _____ 37°/hr./gm./cm.
$P$ = brush pressure _____ 1.5 gms.
$\mu$ = brush to ring coeff. of friction ___ 0.20.
$n$ = number of brushes _____ 40.
$r$ = ring radius _____ $9.25 \times 10^{-2}$ cm.
$\omega_e$ = ring drive frequency _____ 60 r.p.m.
$\omega_b$ = bias velocity _____ Rad./sec., variable.
$e$ = ring eccentricity _____ Cm., variable.

Substituting the above:

$$\dot{\theta} = \frac{41}{\pi}\left[\pi - 2\cos^{-1}\left(1.47 \times 10^{-2} \cdot \frac{\omega_b}{e}\right)\right] \cdot \text{deg./hour} \quad (20)$$

The equation above is plotted in FIG. 4, showing the drift rates ($\dot{\theta}$) for various eccentricities ($e$) and aircraft turn rates ($\omega_b$) for a particular gyroscope having the characteristics listed above.

It can be observed from Equation 19 of the above theoretical analysis that gyro drift rate, $\dot{\theta}$, reaches a maximum when the term $$\frac{r\omega_b}{e\omega_r}$$

attains a value of unity. This is the condition of operation as evidence by Equation 2 when the maximum value of brush sliding velocity over the slip ring produced by eccentric motion is equal in magnitude to the sliding velocity produced by a rotational velocity due to turning the slip ring. Therefore, under conditions of operation when the term $$\frac{r\omega_b}{e\omega_r}$$

is equal to or greater than unity reversals in sliding velocity do not occur and no averging of Coulomb frictional torque is accomplished. This condition of limitation is shown in the graph of FIG. 4 by the line at 41°/hour Static Drift rate and represents the expected drift rate for the gyroscope considered if the slip ring orbital device of the present invention was not applied. This line is also the limiting drift rate that will result for any value of slip ring eccentric motion when the Turning Rate becomes great enough to render the device ineffective.

The three values of eccentricity plotted in FIG. 4 have been chosen as examples to demonstrate the graphical relationship between gyro drift rate. Turning Rate and Slip Ring Eccentric Motion when the slip ring orbital device described herein is applied to a typical gyroscopic instrument.

The actual value of slip ring eccentric motion designed into the device must be determined on the basis of the desired reduction in frictional torque effects under the conditions of turning rates anticipated in the application of the instrument.

The theoretical analysis of the effectiveness of this device resulting in the general expression of Equation 19 assumed in ideal model of Coulomb friction, that is, the property of symmetry of torque for positive and negative sliding velocity. Under practical conditions some asymmetry in Coulomb frictional torque is to be expected and for this reason it is desirable to periodically reverse the slip ring eccentric motion of the device described herein in order to enhance the torque averaging process.

As previously stated, the net effect of Coulomb frictional torque which is anticipated as a result of rotation of a slip ring on a gyroscopic gimbal member is reduced by a factor equal to the ratio of the difference between positive direction sliding time and negative direction sliding time to the period of the slip ring orbital motion when utilizing the present invention as described. This statement is supported by examination of Equations 13 and 17 of the theoretical analysis. When Equation 13 is substituted into Equation 17 the following expression results:

$$\dot{\theta} = \frac{T}{H} \cdot \frac{\Delta t}{dt}$$

where the slip ring Coulomb frictional torque T is reduced by the factor $$\frac{\Delta t}{dt}$$

A production model gyroscope has been built with the slip ring orbital device described herein and evaluation tests have been conducted. Experimental results have been in excellent agreement with the anticipated analytical performance shown in FIG. 4 with a design eccentricity of .002 inch. For example, gyroscope drift rate at a turning rate up to 100 degrees per minute resulted in gyro drift rates less than 3 degrees per hour with a slip ring eccentric motion of .002 inch thereby improving the performance by at least an order of magnitude. It can be seen from FIG. 4 that the greater the slip ring eccentricity the smaller will be the magnitude of gyro drift due to slip ring friction. The value of slip ring eccentricity designed into the device is therefore a compromise between desired performance with turning rates anticipated in the utilization of the instrument, wear on the sliding members, and practical design considerations in packaging the device.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. In gyroscopic apparatus having members rotatable relative to each other about a first axis,
    (a) electrical brush means mounted on one of said members,
    (b) electrical slip ring means positionably disposed on another of said members and having its axis of symmetry parallel to said first axis,
    (c) said brush means and said slip ring means having cooperative, engaging elements which normally tend to introduce undesirable effects with respect to said gyroscopic apparatus, and
    (d) means for rotating said axis of symmetry around said first axis and periodically reversing the direction of rotation of said axis of symmetry whereby said undesirable effects are appreciably reduced.

2. In gyroscopic apparatus,
    (a) a first member having brush means mounted thereon,
    (b) a second member movable relative to said first member about a first axis,
    (c) slip ring means positionably mounted on said second member and having its axis of symmetry disposed parallel to said first axis,
    (d) said brush means and said slip ring means having cooperative, engaging elements which normally tend to introduce undesirable effects with respect to said gyroscopic apparatus,
    (e) means adapted to rotate said axis of symmetry around said first axis while maintaining said axis of symmetry parallel to said first axis, and
    (f) means for rotating said axis of symmetry around said first axis and periodically reversing the direction of rotation of said axis of symmetry whereby said undesirable effects are appreciably reduced.

3. In gyroscopic apparatus having members rotatable relative to each other about a first axis,
    (a) electrical brush means having a plurality of brushes mounted on one of said members,
    (b) electrical slip ring means having a corresponding plurality of slip rings cooperative with said brushes positionably mounted on another of said members, the cooperation of said brushes and slip rings normally tending to produce undesirable gyro drift,
    (c) the centers of said slip rings defining an axis of symmetry,
    (d) support means rotatably mounted on said another member for maintaining said axis of symmetry parallel to and rotatable around said first axis, and
    (e) means for rotating said support means and periodically reversing the direction of rotation thereof whereby said undesirable gyro drift is appreciably reduced.

4. In gyroscopic apparatus as recited in claim 3 wherein said rotatable support means includes an eccentric bearing having an eccentric outer race.

5. In gyroscopic apparatus as recited in claim 3, in which said support means is independently rotatable relative to said members.

6. In gyroscopic apparatus as recited in claim 3, wherein said rotatable support means includes slip ring support bridge means slidably supported upon said another member.

7. In gyroscopic apparatus having members rotatable relative to each other about a first axis,
   (a) an electrical brush block having a plurality of brushes mounted on one of said members,
   (b) slip ring means including a shaft having a corresponding plurality of slip rings mounted thereon cooperative with said brushes and positionably mounted on another of said members,
   (c) the centers of said slip rings defining an axis of symmetry of said shaft,
   (d) said brushes engaging said respective slip rings and applying a torque with respect to said axis of symmetry which normally tends to produce undesirable gyro drift,
   (e) slip ring support bridge means connected to said slip ring shaft for slidably supporting said shaft on said another member,
   (f) eccentric bearing means rotatably supporting said slip ring shaft and adapted to maintain said axis of symmetry parallel to and rotatable around said first axis independently of the relative movement of said members, and
   (g) means for rotating said eccentric bearing means and periodically reversing the direction of rotation thereof whereby said undesirable gyro drift is appreciably reduced.

8. In gyroscopic apparatus having members rotatable relative to each other about a first axis,
   (a) first and second spaced brush means having a first and second plurality of brushes respectively and mounted on diametrically opposed portions of one of said members,
   (b) first and second spaced electrical slip ring means having corresponding first and second pluralities of slip rings respectively cooperative with said first and second brushes respectively and positionably mounted on diametrically opposed portions of another of said members,
   (c) the cooperation of said brushes and slip rings normally tending to produce undesirable gyro drift,
   (d) the centers of said first slip rings defining a first axis of symmetry,
   (e) the centers of said second slip rings defining a second axis of symmetry,
   (f) first and second support means rotatably mounted on said diametrically opposed portions of said another member for respectively maintaining said first and second axes of symmetry parallel to and rotatable around said first axis, and
   (g) means for rotating said support means and periodically reversing the direction of rotation thereof whereby said undesirable drift is appreciably reduced.

9. In gyroscopic apparatus as recited in claim 8 in which said means for rotating said support means further includes means for rotating said first support means in opposite directions with respect to each other and simultaneously reversing the direction of rotation thereof.

10. In gyroscopic apparatus as recited in claim 8 wherein said means for rotating said support means includes a compound bearing having an inner ring mounted on said one member and an outer ring mounted on said another member and a middle ring connected to said eccentric bearing, and means connected to said middle ring for rotating said middle ring around said first axis and periodically reversing the direction of rotation of said middle ring whereby said eccentric bearing has one portion similarly rotated.

11. In gyroscopic apparatus as recited in claim 8 further including electrical means mounted on said another member and electrical leads extending between said slip rings and said electrical means, said electrical leads being partially supported on said bridge support means and having a flexible loop for permitting relative motion between said bridge support means and said another member.

12. In gyroscopic apparatus having members rotatable relative to each other about a first axis,
   (a) first and second spaced compound bearing means for rotatably supporting one of said members relative to another of said members about said first axis,
   (b) electrical brush means mounted on said one of said members,
   (c) electrical slip ring means positionably disposed on another of said members and having an axis of symmetry parallel to said first axis,
   (d) said brush means and said slip ring means having cooperative, engaging elements which normally tend to introduce undesirable effects with respect to said gyroscopic apparatus,
   (e) means for rotating said first and second compound bearing means in opposite directions with respect to each other and periodically reversing their directions of rotation, and
   (f) means responsive to the rotation of said compound bearing means for rotating said axis of symmetry around said first axis and periodically reversing the direction of rotation thereof.

13. In gyroscopic apparatus of the character recited in claim 12 in which said means responsive to the rotation of said compound bearing means includes an eccentric bearing.

14. In gyroscopic apparatus having members rotatable relative to each other about a first axis,
   (a) first and second spaced compound bearing means for rotatably supporting one of said members relative to another of said members about said first axis,
   (b) first and second electrical brush means mounted on said one of said members,
   (c) first and second electrical slip ring means positionably disposed on said another of said members and having first and second axes respectively parallel to said first axis,
   (d) said brush means and said slip ring means having cooperative, engaging elements which normally tend to introduce undesirable effects with respect to said gyroscopic apparatus,
   (e) means for rotating said first and second compound bearing means in opposite directions with respect to each other and periodically reversing their directions of rotation, and
   (f) first and second means responsive to the rotation of said first and second compound bearing means respectively for rotating said first and second axis of symmetry around said first axis and periodically reversing the direction of rotation thereof.

15. In gyroscopic apparatus of the character recited in claim 14 in which said first and second means responsive to the rotation of said first and second compound bearing means includes first and second eccentric bearings respectively.

No references cited.

MILTON KAUFMAN, *Primary Examiner.*

BROUGHTON G. DURHAM, *Examiner.*

J. D. PUFFER, *Assistant Examiner.*